United States Patent [19]
Few, Jr.

[11] 3,916,305
[45] Oct. 28, 1975

[54] ATMOSPHERIC ELECTRICAL CURRENT DETECTOR

[75] Inventor: Arthur A. Few, Jr., Houston, Tex.

[73] Assignee: The United States of America as represented by the Secretary of the Navy, Washington, D.C.

[22] Filed: May 20, 1974

[21] Appl. No.: 471,382

[52] U.S. Cl. .................. 324/72; 324/149; 343/702; 343/898; 343/908
[51] Int. Cl.² ...................... G01R 19/08; G01R 1/06; H01Q 1/36
[58] Field of Search ............ 324/72, 72.5, 120, 149, 324/76 R, 76 A; 73/170 R; 343/807, 898, 908

[56] References Cited
UNITED STATES PATENTS
3,121,196  2/1964  Kasemir ............................... 324/72
3,586,973  6/1971  Lawton et al. ...................... 343/807

OTHER PUBLICATIONS
Cudney et al., "An Ungrounded Electronic Field Meter," Review of Scientific Instruments, Vol. 43, 9-1972, pp. 1372-1373, 324/72.

Primary Examiner—Alfred E. Smith
Assistant Examiner—Wm. H. Punter
Attorney, Agent, or Firm—R. S. Sciascia; R. E. O'Neill

[57] ABSTRACT

An improved atmospheric electrical current detector for measuring current flow in the atmosphere which includes a first hemispherical shell and an opposed second hemispherical shell insulated from each other by an insulating ring and containing therein an electronic package. The entire detector is positionable above the surface of the earth and since the shape is regular, the distortion of the atmosphere potential is calculable and direct current readings of atmospheric current can be obtained.

4 Claims, 2 Drawing Figures

ATMOSPHERIC ELECTRICAL CURRENT DETECTOR

The invention described herein may be manufactured and used by or for the Government of the United States of America for governmental purposes without the payment of any royalties thereon or therefor.

A brief resume of the State of the Art will be helpful in placing the invention in context. The various instruments that have been used to make this measurement in the past fall into the following categories:

Earth Surface Substitution. The principle of this measurement is to replace a large surface area of the earth with some type of plate that is carefully insulated from the rest of the earth but kept essentially at earth potential by the electronic measuring system and then measure the current that flows from the insulated plate. By this procedure one obtains an accurate measure of the air-Earth current as it flows into the Earth. This method yields accurate measurements, when carefully performed, of the total charge-per-unit-time that flows through the plate. This method cannot, however, distinguish between true air conduction current and the charge that is convected by air motions to the plate. The magnitude of these two contributions are approximately equal.

Current to an Elevated Grounded Object. This method has been used employing a horizontal insulated wire 1 meter above the ground which is connected through a current meter to Earth potential. This technique requires an independent measurement of the electric field strength at the same height. It can be shown that from an evaluation of the capacitance of the wire to Earth and a measurement of the current to the wire one obtains the product $\lambda V$, where $\lambda$ is the conductivity due to ions of opposite charge to those on the Earth and V is the undisturbed potential at the height of the wire. Since the wire is 1 meter above the ground then $$\frac{V}{1m} = \bar{E}$$

where $\bar{E}$ is the average electric field strength in the 1 meter layer. If $\lambda$ were the true total conductivity $$\left(\lambda \frac{V}{1m} = \lambda E = I\right)$$

then this would give a true measure of the air-Earth current. However, $\lambda$ is not the total conductivity nor is it necessarily an accurate measurement of the polar conductivity since it is evaluated at the higher field strength present on the surface of the wire compared to what would be present in the absence of the wire. This method must be considered an indirect measurement rather than direct since $\lambda \neq \lambda$ total.

Indirect Measurements. There are many variations to this method but in summary it can be said that they all measure the atmospheric electric field $E$ and the total conductivity $\lambda$. The air-Earth current density is then computed from the Ohms law formula $I = \lambda E$. Ohms law can be used only over limited values of $E$ since $\lambda$ is not truly independent of $E$. Therefore, in order for this method to be accurate $\lambda$ must be measured in a device that produces a field strength $E$ and the process of sampling the air to measure $\lambda$ must not alter the native undisturbed value for $\lambda$. Similarly, the measured electric field strength must be converted to the true undisturbed value for $E$ with precision.

The prior art devices although effective for many purposes have limitations which produce readings which under certain circumstances is not as accurate as desired. The invention disclosed herein is designed to overcome these limitations and to enhance the capabilities of researchers in the field to determine the atmospheric currents.

It is therefore an object of this invention to provide an improved atmospheric electrical current detector for measuring atmospheric current by providing a spheric structure whose distortion of the atmosphere potential is calculable and including within an electric circuitry for measuring the current.

It is yet a further object of this invention to provide an improved atmospheric electrical current detector including an insulated ring supportable above the surface of the earth and having first and second hemispherical shaped sections on opposite sides of the ring and including within it electronic circuitry for measuring current flow from 1 hemisphere to the other.

Another object of this invention is to provide an improved atmospheric electrical current detector comprising, an insulating member having first and second sides, a first conducting shell having a fixed shape affixed to the first side of the insulating member, a second conducting shell having the same shape as the first shell affixed to the second side of the insulating member, means for positioning the ring member and the shell above the surface of the Earth, an electric circuit connected to the shells, means for connecting the first and second shells to the electrical circuit, and means to measure the current in the electric circuit.

Other objects, advantages and novel features of the invention will become apparent from the following detailed description of the invention when considered in conjunction with the accompanying drawing wherein.

Figure 1:
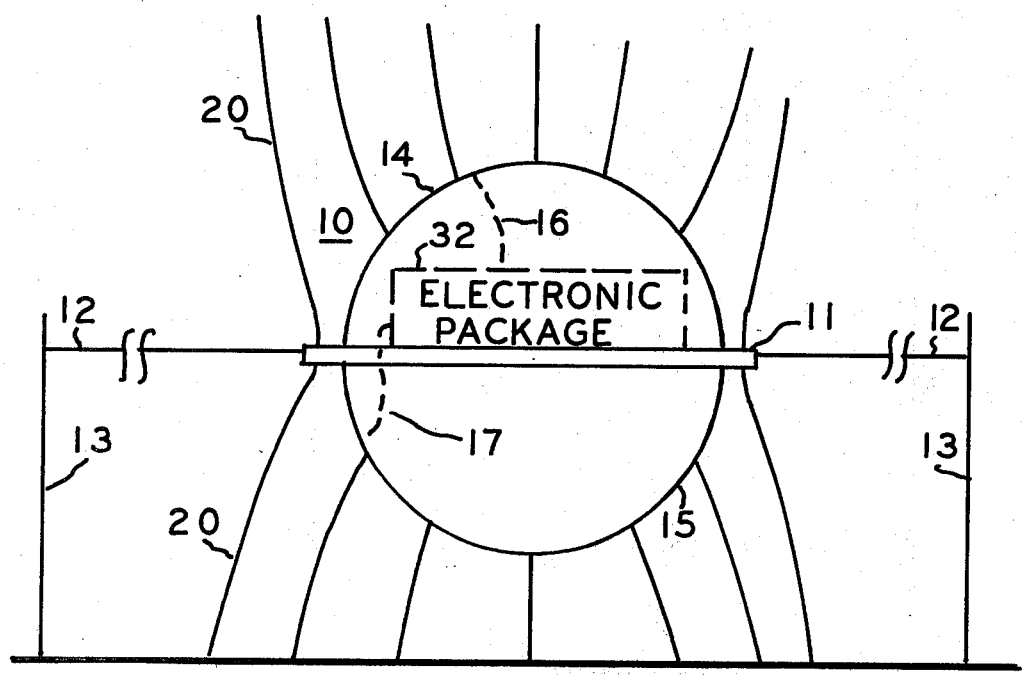
FIG. 1, shows a side view of one embodiment of the invention supported above the ground.

An annular ring 11, is supported by a series of wires 12, from a plurality of posts 13. Mounted on the annular ring 11, is a first aluminum hemisphere 14, and a second aluminum hemisphere 15. Shown in dashed lines within the sphere defined by the two hemispheres 14, 15, and the ring 11, is an electronic package 32, including the circuitry necessary to make the measurements. Wires 16 and 17, connect the two hemispheres to the electronic circuitry inside the electronic package. A series of lines designated as 20, show the electric field flux lines of the air-Earth current lines as distorted by the presence of the detector. Since the structure of the two hemispheres 14 and 15, is a regular geometric figure, the distortion of the air-Earth current lines as indicated by the "pinching in" above the equator of the spheres is calculable.

Figure 2:
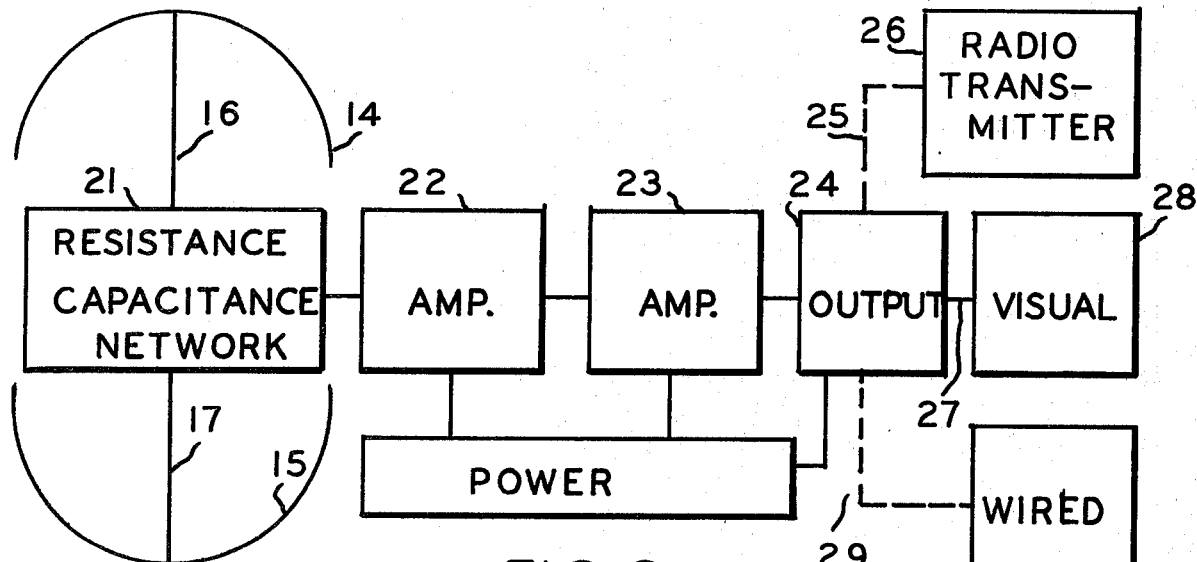
FIG. 2, is a block diagram of one electrical circuitry usable with the invention.

FIG. 2, shows in block diagram form the electronic circuitry in the electronic package 32. Hemispheres 14 and 15, are shown connected by lines 16 and 17 to an RC network 21, which keeps the two at almost the same potential. A high impedance, low input bias amplifier 22, capable of measuring fractions of pico-amps is connected to the RC network. Next in the circuitry is a following amplifier 23, which drives the communicative devices 24, which shows the current outside the spheres. This may be done in any of several ways; the first is shown by the dashed line 25, connected to a radio transmitter 26. The second dashed line 27, indicates that a visual display 28, may be coupled to the outside device and the current read. The last dashed line 29, shows the communicative device wired via 30, to a remote location. In this case, care must be taken not to distort the air-Earth current lines.

In operation, detector 10, is supported above the Earth by strings or wires 12, (with the annular ring 11, in the horizontal position) and is insulated from the Earth. The sphere will (after any net charge has leaked off) assume the potential of the air that surrounds it and the electric field distortion produced by the spherical conductor can be accurately computed with the following equations.

$$\phi = -E_o \left(r - \frac{A^3}{r^2}\right) \cos\theta$$

$$E = E_o \left\{ \left(1 + \frac{2A^3}{r^3}\right) \cos\theta \, \hat{r} - \left(1 - \frac{A^3}{r^3}\right) \sin\theta \, \hat{\theta} \right\}$$

Where $\theta$ is the angle measured from the vertical, $A$ is the radius of the sphere, $r$ is the distance from the center of the sphere to the point being measured, $E_o$ is a uniformly distributed field and $\phi$ is the potential, and $E$ is the gradient of the potential; $\hat{r}$ and $\hat{\theta}$ are unit vectors.

The action of the hemisphere pair is to intercept the air-Earth current as it passes through the air. The area of interception is exactly three times larger than the cross-sectional area of the sphere. In other words, current flowing downwards in the air will follow the distorted electric field lines, enter the top hemisphere, flow through the current meter inside the sphere, flow out of the bottom hemisphere, then through the remaining air to the Earth. Since the electric field distortion is exactly computed and since the current is directly measured this is a direct measurement of the air-Earth current density.

The chief advantages of this instrument are that it is a direct measurement of the conduction current with only minor convective contributions; it can be used above the Earth's surface, and it is small and portable. Furthermore, the design feature which incorporates the measuring circuity inside the hemisphere pair provide environmental and electrical shielding for the sensitive measuring devices.

Obviously many modifications and variations of the present invention are possible in the light of the above teachings. It is therefore to be understood that within the scope of the appended claims the invention may be practiced otherwise than as specifically described.

I claim:

1. An improved atmospheric electrical current detector comprising;
   a. a ring shaped insulating member having first and second sides;
   b. a first conducting hemispherical shell affixed to said first side of said insulating member;
   c. a second conducting hemispherical shell affixed to said second side of said insulating member to form a cavity between said first and second conductive shells;
   d. means for positioning said ring shaped member and said shell above the surface of the Earth said positioning means being affixed to said ring shaped insulating means;
   e. an electric circuit connected to said shells and positioned in said cavity;
   f. means for connecting said first and second shells to said electrical circuit, said connecting means including a resistance-capacitance network to maintain the first and second conducting shells at essentially the same potential; and
   g. means to measure current in an electrical field above the surface of the earth.

2. The improved atmospheric electrical current detector of claim 1 wherein an amplifier circuit is coupled to said resistancecapacitance network to amplify any signal developed across the resistance-capacitance network.

3. The improved atmospheric electrical current detector of claim 2 wherein said means to measure said current in said electrical circuit includes a readout device for indicating the atmospheric electrical current.

4. The improved atmospheric electrical current detector of claim 2 further including telemetering means for transmitting the value of said current to a remotely positioned readout device.

* * * * *